United States Patent
Abergel et al.

(10) Patent No.: US 11,232,205 B2
(45) Date of Patent: Jan. 25, 2022

(54) FILE STORAGE SERVICE INITIATION OF ANTIVIRUS SOFTWARE LOCALLY INSTALLED ON A USER DEVICE

(71) Applicant: Microsoft Technology Licensing, LLC, Redmond, WA (US)

(72) Inventors: Meir E. Abergel, Seattle, WA (US); John D. Rodrigues, Woodinville, WA (US); Filip Chelarescu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 258 days.

(21) Appl. No.: 16/391,513

(22) Filed: Apr. 23, 2019

(65) Prior Publication Data
US 2020/0342105 A1 Oct. 29, 2020

(51) Int. Cl.
*G06F 12/14* (2006.01)
*G06F 21/56* (2013.01)
(Continued)

(52) U.S. Cl.
CPC ............ *G06F 21/568* (2013.01); *G06F 9/547* (2013.01); *G06F 11/327* (2013.01); *G06F 21/554* (2013.01); *G06F 21/566* (2013.01)

(58) Field of Classification Search
CPC ...... G06F 21/568; G06F 21/56; G06F 21/567; G06F 21/577; G06F 21/60; G06F 21/564;
(Continued)

(56) References Cited

U.S. PATENT DOCUMENTS

| 6,880,110 B2 * | 4/2005 | Largman | G06F 11/1417 |
| | | | 714/38.13 |
| 7,107,618 B1 * | 9/2006 | Gordon | G06F 21/56 |
| | | | 709/206 |

(Continued)

FOREIGN PATENT DOCUMENTS

| KR | 20150102866 A | 9/2015 |
| WO | 2008005536 A2 | 1/2008 |

(Continued)

OTHER PUBLICATIONS

"Non Final Office Action Issued in U.S. Appl. No. 16/391,589", dated Nov. 27, 2020, 11 Pages.
(Continued)

*Primary Examiner* — Lizbeth Torres-Diaz
(74) *Attorney, Agent, or Firm* — Michael Best & Friedrich LLP

(57) ABSTRACT

Methods and systems for repairing user devices infected with malicious code. One method includes storing registration information for a plurality of user devices accessing a remote file storage system, the registration information including a unique identifier of each user device and an identifier of an antivirus software installed locally on each user device. The method also includes, in response to detecting an infected file within the remote file storage system, determining a unique identifier of one of the a user device included in the plurality of user devices interacting with the infected file, accessing the registration information to identify, based on the unique identifier of the user device interacting with the infected file within the remote file storage system, an identifier of antivirus software installed locally on the user device, and remotely initiating the antivirus software installed locally on the user device based on the identifier of the antivirus software.

16 Claims, 5 Drawing Sheets

(51) Int. Cl.
*G06F 9/54* (2006.01)
*G06F 11/32* (2006.01)
*G06F 21/55* (2013.01)

(58) Field of Classification Search
CPC ............... H04L 63/145; H04L 63/1433; H04L 63/1416; H04L 63/20; H04L 63/1441; H04L 63/10; H04L 2209/38
See application file for complete search history.

(56) References Cited

U.S. PATENT DOCUMENTS

| | | | | |
|---|---|---|---|---|
| 8,661,547 | B1* | 2/2014 | Kononov | H04L 63/1408 726/24 |
| 8,707,427 | B2* | 4/2014 | Hooks | G06F 21/567 726/22 |
| 8,839,234 | B1* | 9/2014 | Voronkov | G06F 21/31 717/176 |
| 9,825,988 | B2* | 11/2017 | Crawford | H04L 29/06224 |
| 10,079,852 | B2* | 9/2018 | Xie | H04L 63/1441 |
| 10,911,415 | B1* | 2/2021 | Feeser | H04L 63/0272 |
| 11,003,770 | B2* | 5/2021 | Toley | G06N 20/00 |
| 2002/0138760 | A1* | 9/2002 | Naitoh | G06F 21/56 726/24 |
| 2004/0209608 | A1* | 10/2004 | Kouznetsov | H04M 1/72403 455/418 |
| 2007/0240222 | A1* | 10/2007 | Tuvell | G06F 16/245 726/24 |
| 2009/0019547 | A1* | 1/2009 | Palliyil | H04L 63/145 726/25 |
| 2010/0031361 | A1* | 2/2010 | Shukla | G06F 21/567 726/24 |
| 2010/0132042 | A1* | 5/2010 | Zhang | G06F 21/56 726/24 |
| 2010/0257609 | A1* | 10/2010 | Niemela | G06F 21/56 726/24 |
| 2013/0061325 | A1* | 3/2013 | Singh | G06F 21/56 726/24 |
| 2013/0074181 | A1* | 3/2013 | Singh | H04L 67/10 726/22 |
| 2014/0013434 | A1* | 1/2014 | Ranum | H04L 61/1511 726/24 |
| 2014/0130161 | A1* | 5/2014 | Golovanov | H04L 63/1416 726/23 |
| 2014/0289853 | A1* | 9/2014 | Teddy | H04L 63/145 726/23 |
| 2014/0379637 | A1* | 12/2014 | Seinfeld | G06F 21/568 707/610 |
| 2015/0007324 | A1* | 1/2015 | Ngair | H04W 12/128 726/24 |
| 2016/0164894 | A1* | 6/2016 | Zeitlin | H04L 63/1491 726/23 |
| 2017/0111388 | A1* | 4/2017 | Mehta | G06F 21/572 |
| 2017/0177867 | A1* | 6/2017 | Crofton | G06F 21/565 |
| 2017/0255777 | A1* | 9/2017 | Ford | G06F 21/566 |
| 2017/0324756 | A1* | 11/2017 | Adams | H04L 63/145 |
| 2018/0024893 | A1* | 1/2018 | Sella | G06N 7/005 707/648 |
| 2018/0034835 | A1* | 2/2018 | Iwanir | G06F 21/565 |
| 2018/0204000 | A1* | 7/2018 | Charters | G06F 21/568 |
| 2018/0330088 | A1* | 11/2018 | Crofton | G06F 16/113 |
| 2019/0138727 | A1* | 5/2019 | Dontov | G06F 11/1458 |
| 2020/0342105 | A1* | 10/2020 | Abergel | G06F 11/327 |
| 2020/0342106 | A1* | 10/2020 | Chelarescu | G06F 11/1458 |

FOREIGN PATENT DOCUMENTS

| | | |
|---|---|---|
| WO | 2018020362 A1 | 2/2018 |
| WO | 2018125396 A1 | 7/2018 |
| WO | 2018130904 A1 | 7/2018 |

OTHER PUBLICATIONS

"International Search Report & Written Opinion Issued in PCT Application No. PCT/US20/025580", dated Jun. 9, 2020, 9 Pages.

Webster, et al., "Fast and Service-Preserving Recovery from Malware Infections Using CRIU", In Proceedings of 27th USENIX Security Symposium, Aug. 15, 2018, pp. 1198-1211.

"International Search Report and Written Opinion Issued in PCT Application No. PCT/US2020/025576", dated May 28, 2020, 10 Pages.

"Final Office Action Issued in U.S. Appl. No. 16/391,589", dated Jun. 1, 2021, 16 Pages.

* cited by examiner

FILE STORAGE SERVICE INITIATION OF ANTIVIRUS SOFTWARE LOCALLY INSTALLED ON A USER DEVICE

CROSS-REFERENCE TO RELATED APPLICATIONS

This application is related to co-pending U.S. patent application Ser. No. 16/391,589, filed Apr. 23, 2019, titled "AUTOMATED MALWARE REMEDIATION AND FILE RESTORATION MANAGEMENT," the entirety of which is herein incorporated by reference.

FIELD

Embodiments described herein generally relate detecting infected files stored in a remote file storage system and, in response to such detection, initiating, from the remote file storage system, antivirus software installed locally on the client device uploading or modifying the infected files.

SUMMARY

Remote file storage systems store files for access by a plurality of electronic devices from locations other than the physical location of the storage system. Because the files are shared between multiple devices, one device can potentially upload infected files, such as files infected with ransomware, malware, adware, or other malicious code and, thus, expose other devices utilizing the remote file storage system to the infected files.

Remote file storage systems may employ preventative measures to prevent the storage and distribution of corrupt files, such as by executing antivirus software. These preventative measures may identify and even repair corrupt files stored within the remote file storage system. However, without addressing the source of the infected files, devices may continue to upload or create (through modification of existing stored files) infected files to the remote file storage system, and the preventive measures of the remote file storage system may not be able to identify and address this activity quickly enough to prevent the spread of the infected files. Furthermore, even if a remote file storage system notifies a user of an infected file that may be originated from the user's device, the user may not have the knowledge or resources to manually address the situation at their device.

Thus, embodiments described herein provide, among other things, systems and methods for addressing infected files at the source by initiating, from the remote file storage system, antivirus software locally installed on the electronic devices uploading or modifying detected infected files stored within the remote file storage system.

For example, one embodiment provides a method for repairing user devices infected with malicious code. The method includes storing registration information for each of a plurality of user devices accessing a remote file storage system, wherein the registration information for each of the plurality of user devices includes a unique identifier of each user device and an identifier of an antivirus software installed locally on each user device. The method also includes, in response to detecting an infected file within the remote file storage system, determining, with an electronic processor remote from each of the plurality of user devices, a unique identifier of a user device included in the plurality of user devices interacting with the infected file within the remote file storage system, accessing, with the electronic processor, the registration information to identify, based on the unique identifier of the user device interacting with the infected file within the remote file storage system, an identifier of antivirus software installed locally on the user device, and remotely initiating, with the electronic processor, the antivirus software installed locally on the user device based on the identifier of the antivirus software.

Another embodiment provides a system for repairing user devices infected with malicious code. The system includes a memory storing a plurality of files within a remote file storage system accessible by a plurality of user devices, and an electronic processor. The electronic processor is configured to, in response to detection of an infected file within the plurality of files stored within the memory, determine a user device included in the plurality of user devices interacting with the infected file, determine antivirus software installed locally on the user device, prompt a user associated with the user device to approve remote initiation of the antivirus software installed locally on the user device, and, in response to receiving approval of the remote initiation of the antivirus software, remotely initiate the antivirus software installed locally on the user device.

A further embodiment provides a non-transitory computer-readable medium storing instructions that, when executed by an electronic processor, perform a set of functions. The set of functions including determining a user device interacting with an infected file detected within a remote file storage system, determining antivirus software installed locally on the user device, prompting a user associated with the user device to approve remote initiation of the antivirus software installed locally on the user device, and remotely initiating the antivirus software installed locally on the user device in response to receiving approval of the remote initiation.

DETAILED DESCRIPTION

Figure 1:
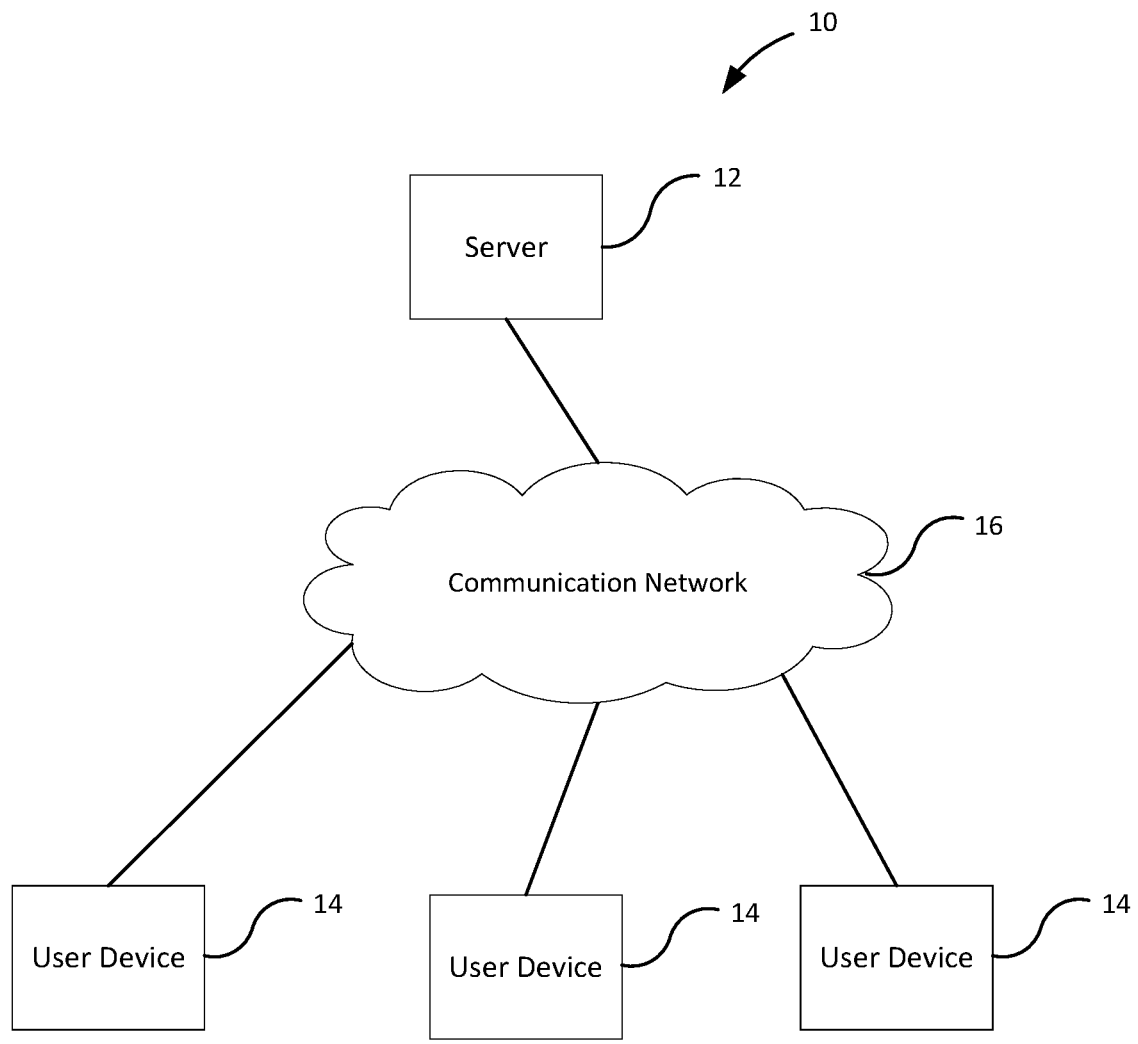
FIG. 1 schematically illustrates a system for repairing user devices infected with malicious code according to some embodiments.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As described above, even when a remote file storage system is configured to detect and address infected files stored within the remote file storage system, the user device originally uploading or modifying the infected file may continue to spread infected files. Accordingly, embodiments described herein provide methods and systems for remotely initiating antivirus software locally installed on a user device in response to detecting that a file uploaded or modified by the user device within the remote file storage system is infected. These methods and systems more effectively attack the spread of infected files at a source (a user device), which improves security of data and devices and reduces wasted computer resources detecting and addressing infected files.

FIG. 1 schematically illustrates a system 10 for repairing user devices infected with malicious code. As illustrated in FIG. 1, the system 10 includes a remote file storage system 12, a plurality of user devices 14 (also referred to individually as a user device 14), and a communication network 16. It should be understood that the system 10 is provided as an example and, in some embodiments, the system 10 includes additional components. For example, the system 10 may fewer or additional user devices 14, more than one remote file storage system 12, more than one communication network 16, and the like.

The remote file storage system 12 and the plurality of user devices 14 communicate over the communication network 16. Portions of the communication network 16 may be implemented using a wireless network, such as a wide area network (for example, the Internet), a local area network (for example, a Bluetooth™ network or Wi-Fi), or combinations or derivatives thereof. Alternatively or in addition, portions of the communication network 16 may be implemented using dedicated connections (such as wired or wireless connections). It should also be understood that, in some embodiments, the remote file storage system 12 and the plurality of user devices 14 may communicate through one or more intermediary devices not shown in FIG. 1.

Figure 2:
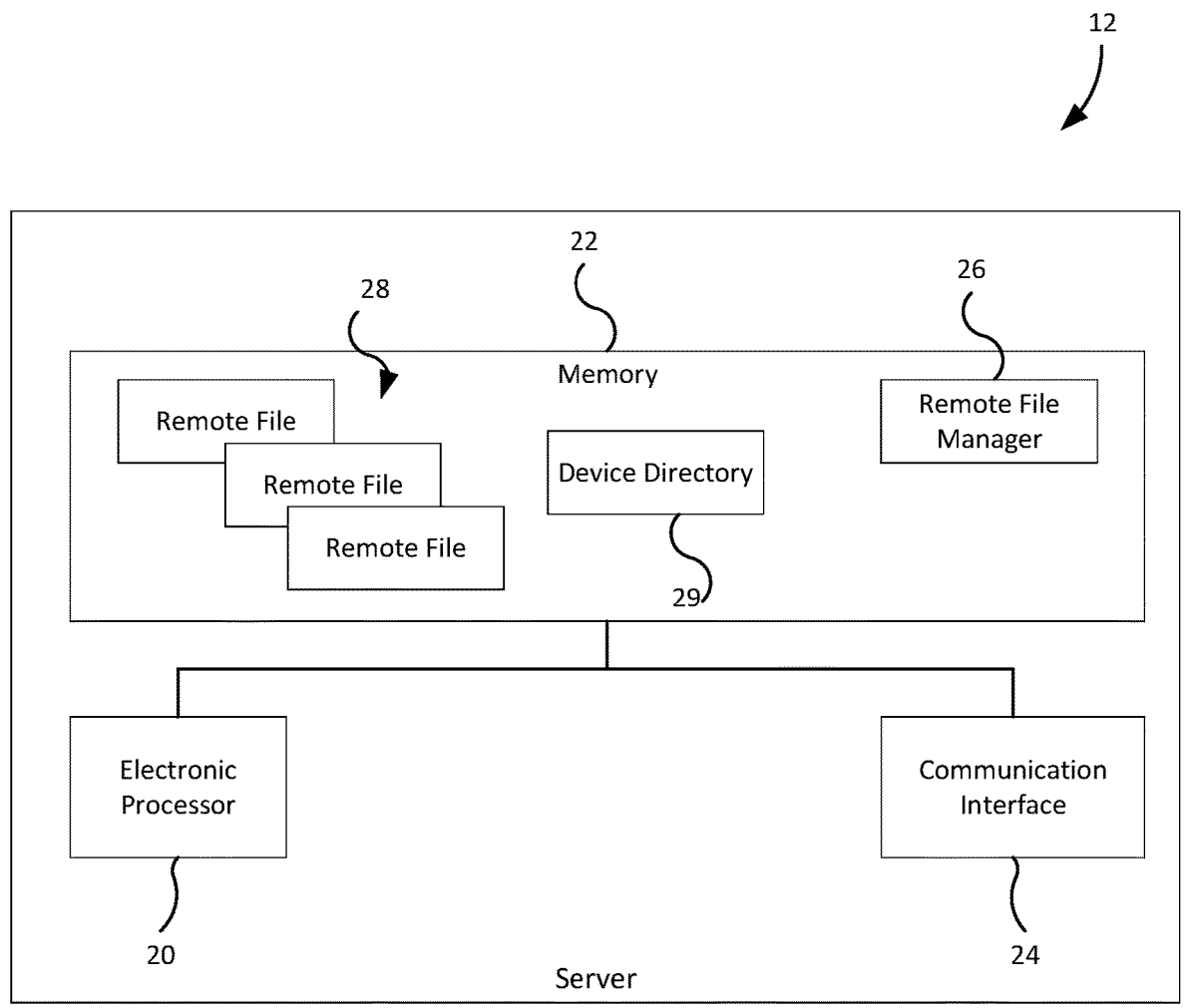
FIG. 2 schematically illustrates a server included in the system of FIG. 1 according to some embodiments.

The remote file storage system 12 includes one or more computing devices, such as one or more servers. For example, as illustrated in FIG. 2, in some embodiments, the remote file storage system 12 includes at least server including an electronic processor 20, a memory 22, and a communication interface 24. The electronic processor 20, the memory 22, and the communication interface 24 communicate over one or more communication lines or buses, wirelessly, or a combination thereof. In some embodiments, the remote file storage system 12 includes additional components than those illustrated in FIG. 2 and the components included in the remote file storage system 12 may arranged in various configurations. For example, as previously noted, in some embodiments, the remote file storage system 12 includes a plurality of servers, databases, and the like to provide a remote file storage service.

The communication interface 24, which may include a wireless transceiver, allows the remote file storage system 12 to communicate with external devices, such as the plurality of user devices 14 over the communication network 16.

The memory 22 includes a non-transitory, computer-readable storage medium. The electronic processor 20 includes a microprocessor, application-specific integrated circuit (ASIC), or another suitable electronic device. The electronic processor 20 is configured to retrieve data from the memory 22 and execute, among other things, software (instructions) related to the methods described herein.

For example, as illustrated in FIG. 2, the memory 22 stores a remote file manager 26. The remote file manager 26 includes instructions that, when executed by the electronic processor 20, stores and controls access to a plurality of files 28 (each file also individually referenced herein as file 28) stored in the memory 22 or other remote storage locations included as part of the remote file storage system 12 to provide the remote file storage service. For example, the remote file manager 26 controls access to the files 28 by the plurality of user devices 14 as well as the addition, deletion, and modification of the files 28 by the plurality of user devices. The remote file storage system 12 additionally stores metadata about each of the files 28. The metadata may include original creation date, a last modified date, and a record of what user devices 14 have uploaded, accessed, or modified the file, and, optional, details regarding the type of modifications made to a file. For example, each of the plurality of user devices 14 may have a unique identifier with the remote file storage system 12, and these identifiers can be included in the metadata for a file 28 to record what user devices 14 uploaded, accessed, or otherwise modified a file 28.

The remote file storage system 12 may also store (in the memory 22) a device directory 29, such as a table or other data structure. The device directory 29 stores registration information for each of the plurality of user devices 14. The registration information includes the unique identifier of the user device 14, which may be a serial number, an address (a media access control (MAC) address), a user-generated identifier, or other type unique identifier. The registration information includes one or more identifiers of antivirus software installed locally on each user device 14. Each identifier may represent installed antivirus software by name, provider, version, or other identifying information. Optionally, the registration information may include further information about each user device 14, such as operating system, operating system version, file structure information, other remote file storage systems the user device 14 is associated with, device model, device type (for example, smartphone, laptop, and the like), and the like. The registration information may also include information about a user associated with the user device 14, groups or organizations a user is associated with, or the like.

Figure 3:
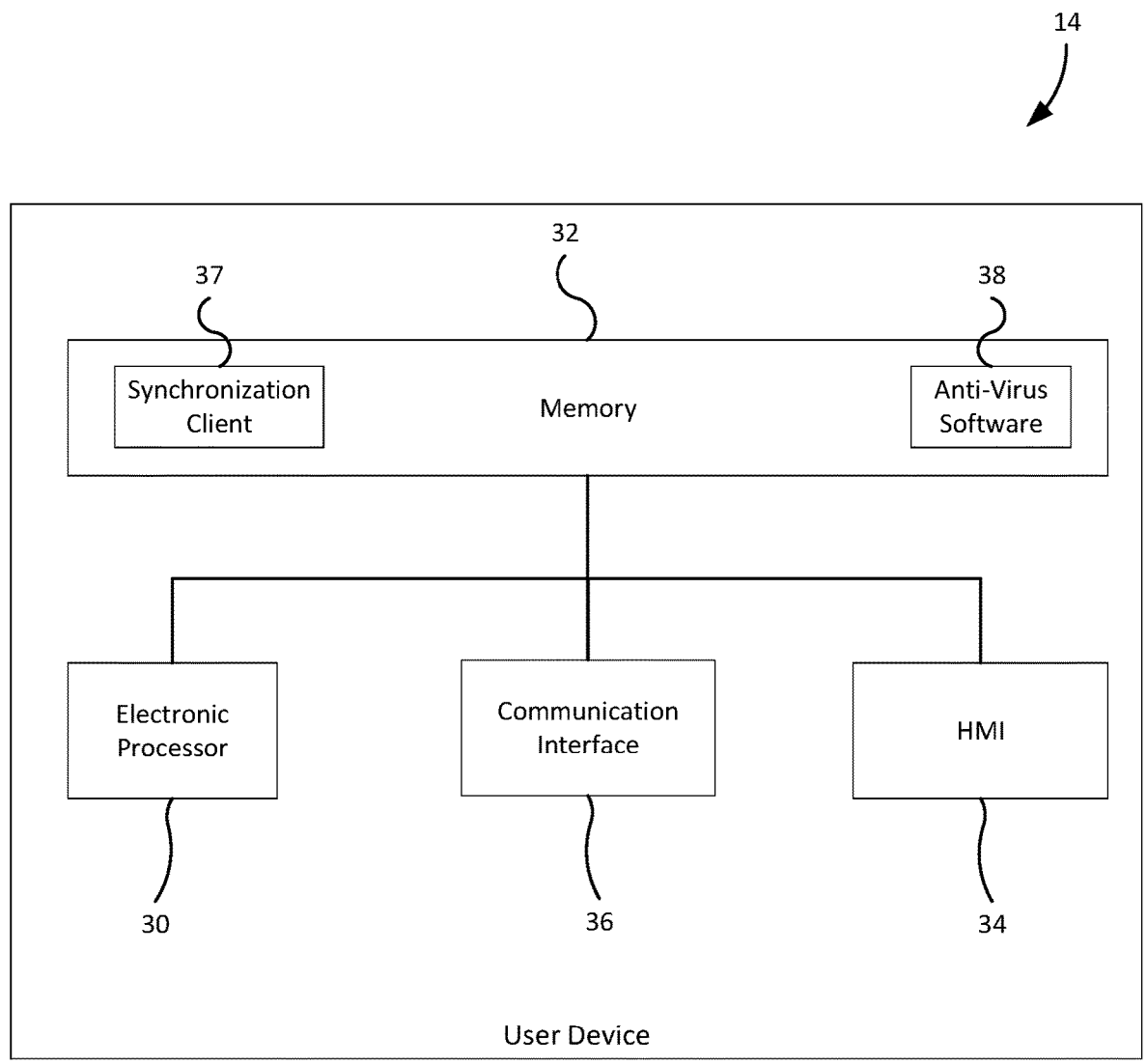
FIG. 3 schematically illustrates a user device included in the system of FIG. 1 according to some embodiments.

Each of the plurality of user devices 14 is remote (separate) from the remote file storage system 12 and includes a computing device, such as a desktop computer, a laptop computer, a tablet computer, a terminal, a server, a smart television, an electronic whiteboard, a tablet computer, a smart telephone, a wearable device, or the like. As illustrated in FIG. 3, in some embodiments, a user device 14 includes an electronic processor 30, a memory 32, a human-machine interface (HMI) 34, and a communication interface 36. The electronic processor 30, the memory 32, the HMI 34, and the communication interface 36 communicate over one or more communication lines or buses, wirelessly, or a combination thereof. In some embodiments, the user device 14 includes additional components than those illustrated in FIG. 3, such as additional memories, processors, or the like. In addition, the components included in the user device 14 illustrated in FIG. 4 may arranged in various configurations.

The communication interface 36, which may include a wireless transceiver, allows the user device 14 to communicate with external devices, such as the remote file storage system 12 over the communication network 16.

The HMI 34 includes an input device, an output device, or a combination thereof. For example, the HMI 34 may include a display device, a touchscreen, a keyboard, a keypad, a button, a cursor-control device, a printer, a speaker, a virtual reality headset, a microphone, and the like. In some embodiments, the user device 14 includes multiple HMIs. For example, the user device 14 may include a touchscreen and a keypad. In some embodiments, a HMI 34 is included in the same housing as the user device 14. However, in other embodiments, a HMI 34 may be external to the user device 14 but may communicate with the user device 14 over a wired or wireless connection. For example, in some embodiments, the user device 14 includes a display device connected to the user device 14 via a cable.

The memory 32 includes a non-transitory, computer-readable storage medium. The electronic processor 30 includes a microprocessor, application-specific integrated circuit (ASIC), or another suitable electronic device. The electronic processor 20 is configured to retrieve data from the memory 32 and execute, among other things, software instructions to perform various functionality. It should be understood that the user device 14 may also perform additional functionality than the functionality described in the present application.

Figure 4:
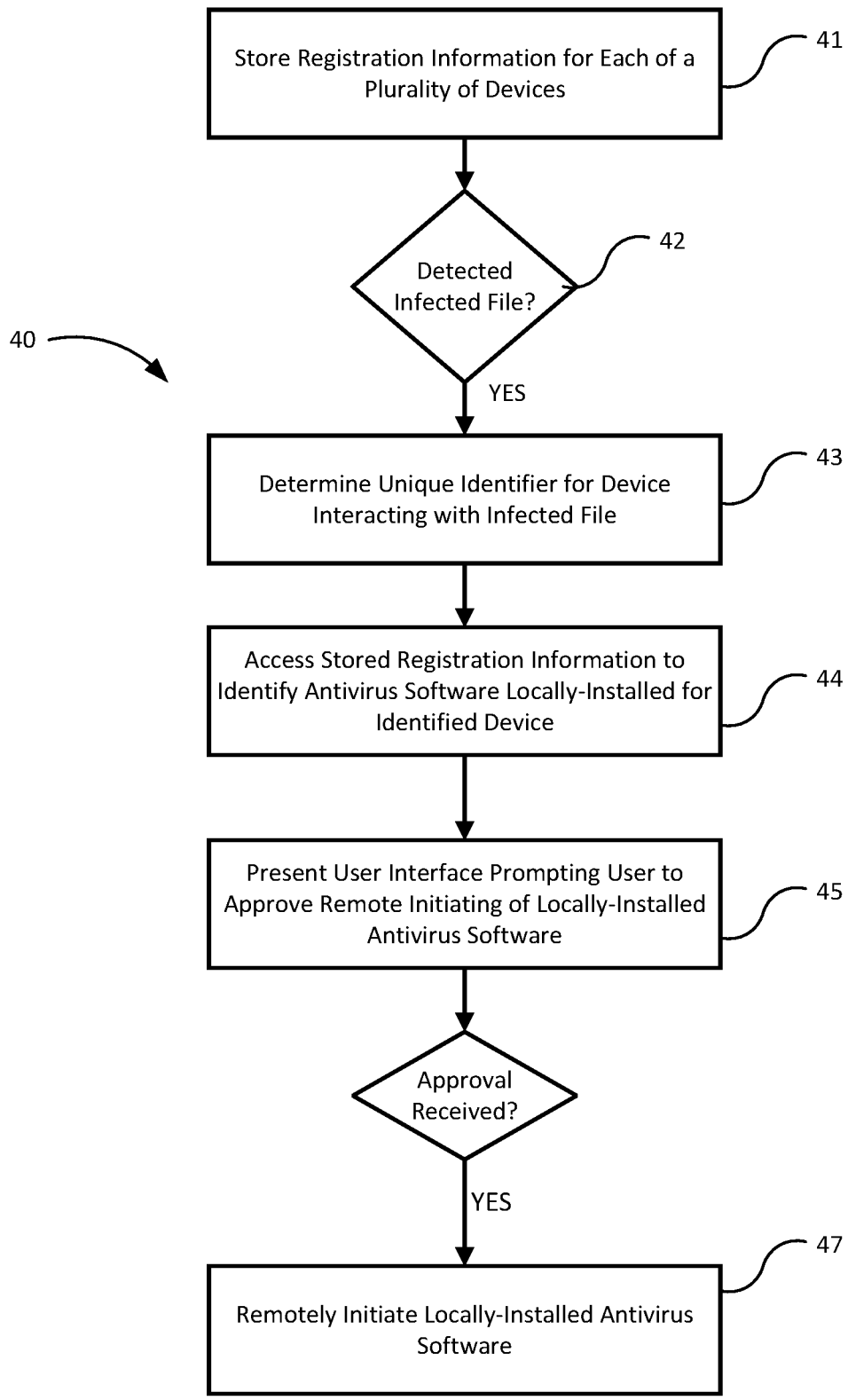
FIG. 4 is a flowchart illustrating a method for repairing user devices infected with malicious code performed by the system of FIG. 1 according to some embodiments.

As illustrated in FIG. 4, the memory 32 stores antivirus software 38. The antivirus software 38 is a software application that, when executed by the electronic processor 30, prevents, detects, and removes malicious files and applications from computing devices, such as the user device 14. For example, the antivirus software 38 protects and repairs a user device from malicious code, including but not limited to computer viruses, spyware, adware, keyloggers, spam, ransomware, and the like. In some embodiments, a user device 14 may have multiple antivirus software applications installed, such as different types of antivirus software for different types of malicious code or provided by different companies. It should also be understood that the antivirus software 38 locally installed on a user device 14 may include a client application that interacts with one or more servers or other remote systems to perform malicious code prevention or detection. Thus, not all of the antivirus functionality performed with respect to a user device 14 may be performed locally or directly by the antivirus software 38.

The memory 32 also stores a synchronization ("sync") client 37. The synchronization client 37 is a software application that, when executed by the electronic processor 30, allows the user device 14 to access the remote file storage system 12 and may synchronize files 28 managed by the remote file storage system (for example, access, upload, download, and modify files 28). For example, in some embodiments, the synchronization client 37 automatically synchronizes files marked for remote storage that are locally stored on a user device 14 to the remote file storage system 12 to synchronize the state of these files between the user device 14 and the remote file storage system 12. The synchronization client 37 may also provide user interfaces that allow a user of the user device 14 to locate and interact with files available through the remote file storage system 12 even if the file is not also locally installed on the user device 14. For example, the synchronization client 37 may be configured to alert users when new or updated files are available via the remote file storage system 12. It should be understood that, in some embodiments, functionality performed by the synchronization client 37 as described herein may be distributed among a plurality of software applications or modules.

In some embodiments, the synchronization client 37 provides registration information for the user device 14 to the remote file storage system 12. For example, the synchronization client 37 may provide the unique identifier of the user device 14 and the identifier of the antivirus software 38 locally installed on the user device 14 to the remote file storage system 12. In some embodiments, each time the user device 14 interacts with the remote file storage system 12, the synchronization client 37 installed on the user devices provides registration information (or any available updated registration information) to the remote file storage system 12 to keep the registration information managed by the remote file storage system 12 up to date. In other embodiments, the synchronization client 27 provides registration information (including updates to registration information) to the remote file storage system 12 at other frequencies or in response to other triggers. For example, in some embodiments, the synchronization client 37 is configured to monitor for any local installations of antivirus software on a user device 14 and update the registration information stored by the remote file storage system 12 for each new installation. Furthermore, in some embodiments, the synchronization client 37 may scan for installed antivirus software in response to a request from the remote file storage system 12, such as when the remote file storage system 12 detects infected files as described below. Also, in some embodiments, antivirus software applications may be configured to register with the remote file storage system 12. For example, the synchronization client 37 installed on a user device 14 may receive information from the antivirus software 38, combine this information with information regarding the user device 14, and register the user device 14 and the associated antivirus software 38 with the remote file storage system.

Each of the plurality of user devices 14 (through execution of the synchronization client 37) can access the files 28 stored by the remote file storage system 12 (through execution of the remote file manager 26). Accordingly, a user using one of the plurality of user devices 14 can remotely access a file 28, upload a new file 28, download an existing file 28, and modify a file 28 regardless of where the user device 14 is located with respect to the remote file storage system. As also described above, a user device 14 infected with malicious code, such as ransomware, may upload infected files to the remote file storage system 12 or may modify existing files stored in the remote file storage system 12 to create infected files. As described above, although remote file storage systems are generally configured to detect and correct for these activities, the user device 14 representing the source of the infected files may remain infected with the malicious code. Thus, the remote file storage system 12 described herein is configured to, in response to detecting the upload or modification of an infected file within the remote file storage system 12, initiating antivirus software 38 locally-installed on the user device 14 representing a source of the infected file.

For example, FIG. 4 is a flow chart illustrating a method 40 for repairing user devices 14 infected with malicious code. The method 40 is described as being performed by the remote file storage system 12 (the remote file manager 26 as executed by the electronic processor 20).

As illustrated in FIG. 4, the method 40 includes storing, at the remote file storage system 12, registration information for each of the plurality of user devices 14 (at block 41). As described above, the registration information may be stored in the device directory 29 and may include, among other information, a unique identifier of each of the plurality of user devices 14 and an identifier of each antivirus software 38 installed locally on each of the plurality of user devices 14. The registration information may be stored when a user device 14 first accesses the remote file storage system 12 or by a different registration method, such as by an administrator of the remote file storage system 12 importing a list of user devices 14 to be registered or by a user manually entering registration information or a portion thereof as part of an initial account registration or subscription process for the remote file storage service (for example, through one or more user interfaces).

In some embodiments, the remote file storage system 12 also stores a list of approved antivirus software applications that can be registered. The remote file storage system 12 may use this list when infected files are detected as described below to determine whether locally-installed antivirus software 38 can be remotely initiated. Alternatively or in addition, the remote file storage system 12 may use this list as part of establishing the registration information. For example, when a user device 14 attempts to register an antivirus software application that is not on the list of approved antivirus software applications, the remote file storage system 12 may not register the device, may prompt the user to install an approved antivirus software, may not store an identifier of the antivirus software in the registration information, or a combination thereof. As described in more detail below, the list of approved antivirus software applications allows the remote file storage system 12 to initiate only trusted antivirus software to repair user devices 14 potentially including malicious code. The list of approved antivirus software applications may also provide information regarding the antivirus software, such as how the software is remotely initiated, including indicating which antivirus software applications are compatible with an application programming interface (API) call from the remote file storage system 12 and details regarding how the API call should be constructed for particular antivirus software applications for various situations.

As illustrated in FIG. 4, the method 40 also includes detecting, with the remote file storage system 12, an infected file stored within the remote file storage system 12 (at block 42). Infected files may be detected in a variety of ways. Infected files may be detected whether previously unencrypted files are now encrypted, such as by file entropy. Similarly, some malicious code is associated with known file extensions or file naming patterns and, thus, infected files may be identified by comparing the file extensions or file names to the known file extensions and file naming patterns. Infected files may also have file types incompatible with the data stored within them (such as being identified as a .jpg type but not containing image data). Other methods, such as analysis of data within files, machine learning techniques built from user feedback identifying infected and not infected files, and the like, may be used to detect infected files. The remote file storage system 12 may include a native antivirus software application configured to detect infected files. The remote file storage system 12 may be configured to detect infected files during an upload process for a new file to be stored in the remote file storage systems, during a modification of an existing file stored in the remote file storage system 12, on a routine basis (for example, by running the native antivirus software application at scheduled times), or a combination thereof.

In response to detecting an infected file, the remote file storage system 12 may be configured to take various actions to repair the remote file storage system 12, such as by quarantining the infected file, deleting the infected file, or the like. In addition, as illustrated in FIG. 4, in response to detecting an infected file, the remote file storage system is configured to determine a unique identifier of a user device 14 that interacted with the infected file, such as the user device 14 that uploaded or a user device that modified the infected file (at block 43). When the infected file is detected during an upload or modification of the file, the identifier of the user device 14 may be known or queried for as part of the upload process. Alternatively, when an infected file is detected during, for example, a routine check by any native antivirus software of the remote file storage system 12, the remote file storage system 12 may access metadata associated with the detected infected file to determine the identifier of one or more user devices 14 that recently interacted with the infected file. In some situations, the remote file storage system 12 may be able to identify a single user device 14 responsible for the detected infected file. However, in other situations, the remote file storage system 12 may only be able to identify a set of two or more user devices 14 potentially responsible for the detected infected file. In this situation, the remote file storage system 12 may be configured to attempt to repair each user device 14 in the set as described below.

Using the identifier of the user device 14 associated with the detected infected file, the remote file storage system 12 accesses the stored registration information to identify the antivirus software 38 installed on the user device 14 (at block 44). For example, the remote file storage system 12 may use the unique identifier of the user device 14 to pull data from the device directory 29, which may include a table containing the unique device identifiers along with the associated identifier for installed antivirus software applications. As described above, the remote file storage system 12 may compare the identified antivirus software 38 installed at the user device 14 to the list of approved software applications to ensure that the locally-installed software represents trusted antivirus software before remotely initiating the antivirus software 38. Accordingly, when the identified antivirus software 38 installed at the identified user device 14 is not one of the approved software applications, the remote file storage system 12 may not remotely initiate the installed antivirus application 38. However, in this situation, the remote file storage system 12 may take one or more other actions to address the potential infection of the user device 18. For example, the remote file storage system 12 may present one or more alerts, such as through the synchronization client 37 or separately, such as an email, text, or the like to alert a user associated with the user device 14 of the potential infection. The alert may include information regarding the time of the attack, the devices impacted by the attack, the files impacted by the take, and potentially manual steps a user may take to remedy the situation (including an option to restore locally-stored files).

As illustrated in FIG. 4, based on the identified locally-installed antivirus software 38, the remote file storage system 12 remotely initiates the antivirus software 38 (at block 47). In situations where a user device 14 has multiple antivirus software applications installed, the remote file storage system 12 may also be configured to automatically select one or more of the applications to remotely initiate based on the available installed applications, the user device 14, the detected infected file, or a combination thereof. For example, the remote file storage system 12 may apply one or more rules in these situations to determine which applications to initiate. In other embodiments, however, the remote file storage system 12 may be configured to initiate each installed application.

In some embodiments, the remote file storage system 12 constructs an API call for the antivirus software 38 locally-installed on the identified user device 14 to remotely initiate the antivirus software 38. The API call may be constructed based on the identifier of the antivirus software 38 stored as part of the registration information. In other embodiments, the API call may also be based on the user device 14, such as such as the operating system installed on the user device 14, the version of the installed operating system, or the like. Furthermore, in some embodiments, the API call may also be based on the infected file. For example, the API may pass information regarding the infected file to the antivirus software 38 to aid the antivirus software 38 in performing the appropriate checks or scans to repair the user device 14. Accordingly, the remote file storage system 12 may store one or more configuration files or instruction sets for creating API calls for different antivirus software applications under various circumstances. After the API call is constructed, the remote file storage system 12 transmits the API call to the antivirus software 38. In some embodiments, the remote file storage system 12 transmits the API call to the antivirus software 38 indirectly through the synchronization client 37. Also, in some embodiments, the remote file storage system 12 initiates the antivirus software 38 using different mechanisms, such as by transmitting a message to a server associated with the antivirus software 38, which responds to the message by initiating the antivirus software 38 locally installed on the user device 14 or issuing a command to an operating system of the user device 14. It should be understood that initiating the antivirus software 38, as this term is used in the present application, includes activating (initiating execution of) an antivirus software application as well as modifying behavior of an active (already-being executed) antivirus software application, such as by requesting performance of a particular type of device scan or other process for detecting malicious code.

As illustrated in FIG. 4, in some embodiments, the remote file storage system 12 may optionally be configured to present a user interface to a user associated with the user device to prompt the user to approve remote initiation of the antivirus software 38 (at block 45). In this embodiment, the remote file storage system 12 may be configured to remotely initiate the antivirus software 38 when the remote file storage system 12 receives approval from the user. Also, in some embodiments, the remote file storage system 12 may be configured to remotely initiate the antivirus software 38 even when the remote file storage system 12 does not receive user approve through the user interface but a predetermined amount of time has passed since the prompt was provided. The predetermined time may be configurable, such as by the user or an administrator, such as an administrator associated with an organization to which the user belongs.

Figure 5:
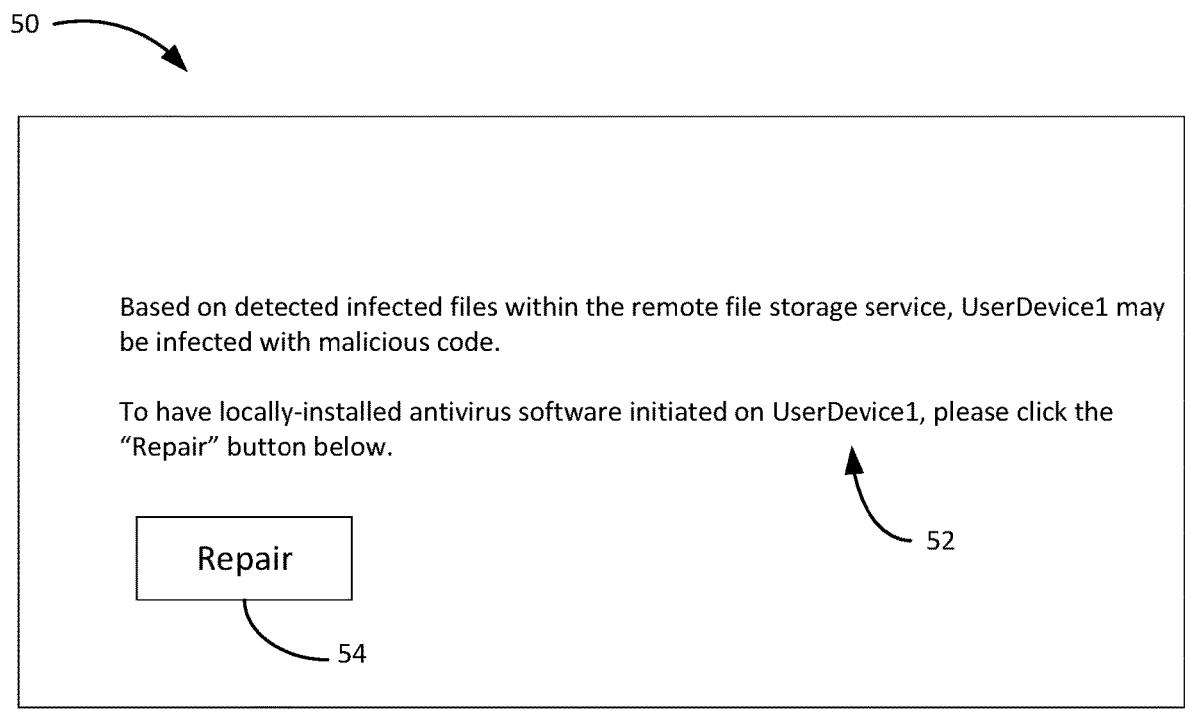
FIG. 5 illustrates an example user interface for approving activation of antivirus software on a user device generated as part of the method of FIG. 4 according to some embodiments.

An example user interface 50 prompting for this approval is illustrated in FIG. 5. The user interface 50 may include a message 52 and a selection mechanism 54, such as a "Repair" button as illustrated in FIG. 5. The message 52 may indicate that, based on an infected file detected within the remote file storage system 12, the user device 14 may be infected with malicious code. The message 52 also inform the user that if the user wants to initiate antivirus software 38 locally-installed on the user device 14 to attempt to repair the user device 14, the user should select the selection mechanism 54. Accordingly, the user can select the selection mechanism 54 to approve remote initiation of the antivirus software 38. The user interface 50 may be presented on the user device 14 that was identified as interacting with the infected file (uploading the file or modifying the file), such as through the synchronization client 37 installed on the user device 14. Alternatively or in addition, the user interface 50 may be presented via other user devices 14 that are associated with the same user as the identified user device 14. For example, when the identified user device 14 is a desktop computer, the user interface 50 may be presented on the desktop computer, a smartphone associated with the same user, or a combination thereof. For example, the user interface 50 may be provided within an email message, a text message, an instant message, an application notification, or the like. In some embodiments, the message 52 may include additional or different information than the example message 52 illustrated in FIG. 5, such as details of the detected infected file, other actions a user can take to address the issue, and the like. Also, in some embodiments, the user interface 50 may include one or more additional selection mechanisms that allow a user to take other actions, such as an "Ignore" button to explicitly decline or reject remote initiation of the antivirus software 38 or a "Restore" button to restore files 28 stored in the remote file storage system 12 to the user device 14. Furthermore, in some embodiments, the remote file storage system 12 may transmit a message to a user alerting the user of the potential malicious code wherein the message instructs the user to access the synchronization client 37 on the identified user device to access the user interface 50 and, if desired, approve the remote initiation of the antivirus software 38.

In some embodiments, during or after the antivirus software 38 has run on the user device 14 as initiated by the remote file storage system 12, the antivirus software 38 may provide status information to the synchronization client 37, which may pass the status information to the remote file storage system 12. The status information may indicate a current stage of an antivirus scan or check being performed by the antivirus software 38 (for example, percent complete, time remaining until completion, number of files scanned and repaired, or the like). The status information may also indicate whether the antivirus software 38, as initiated by the remote file storage system 12, completed a scan or check successfully and whether any files were successful repaired (for example, unencrypted, removed, or the like). The status information, or a portion thereof, may be provided to the user by the remote file storage system 12, such as through the synchronization client 37. Also, in some embodiments, when the antivirus software 38 fails to repair the user device 14 (for example, fails to remove ransomware or other malicious code from the user device 14), the remote file storage system 12 (for example, via the synchronization client 37) may provide additional information to a user with the status information, such as recommendations for manual steps a user make take to attempt to repair the user device 14.

Similarly, regardless of whether the antivirus software 38 is successful, the remote file storage system 12 may also provide information to a user outlining various solutions for avoiding future infections. For example, based on a type of infected file identified, the remote file storage system 12 may provide the user with steps to avoid accidentally downloading suspicious or malicious files or applications. The solutions provided to the user may be further based upon the type of device affected by the infected file, the operating system affected, and other factors that may be obtained from the registration information or from the identified user device 14.

Thus, embodiments described herein provide methods and systems for repairing user devices infected with malicious code when infected files are detected within a remote file storage system. In particular, as described above, antivirus software locally installed on a user device may be remotely initiated by a remote file storage service to repair the user device (in addition to any actions taken by the remote file storage service to dispose of other repair the infected files). The remote initiation may be performed automatically by the remote file storage service (without requiring manual input) or may be presented as an option for selection by a user to allow for user-control over the remote initiation while still eliminating the need for the user to take steps to manually initiate a locally-installed antivirus software application.

Various features and advantages of some embodiments are set forth in the following claims.

What is claimed is:
1. A method for repairing user devices infected with malicious code, the method comprising:
storing registration information for each of a plurality of user devices accessing a remote file storage system, the registration information for each of the plurality of user devices including a unique identifier of each user device and an identifier of an antivirus software installed locally on each user device; and
in response to detecting an infected file within the remote file storage system,
determining, with an electronic processor remote from each of the plurality of user devices, a unique identifier of a user device included in the plurality of user devices interacting with the infected file within the remote file storage system, wherein interacting with the infected file includes at least one selected from a group comprising uploading the infected file to the remote file storage system, accessing the infected file included within the remote file storage system, and modifying the infected file included within the remote file storage system,
accessing, with the electronic processor, the registration information to identify, based on the unique identifier of the user device interacting with the infected file within the remote file storage system, an identifier of antivirus software installed locally on the user device, and
remotely initiating, with the electronic processor, the antivirus software installed locally on the user device based on the identifier of the antivirus software identified based on the registration information.

2. The method of claim 1, further comprising presenting a user interface prompting a user of the user device to approve remote initiation of the antivirus software locally installed on the user device, and
wherein remotely initiating the antivirus software installed locally on the user device includes remotely initiating the antivirus software installed locally on the user device in response to receiving approval to remotely initiate the antivirus software through the user interface.

3. The method of claim 1, wherein the registration information further includes at least one selected from a group consisting of an operating system installed locally on each of the plurality of user devices, a version of the operating system installed locally on each of the plurality of user devices, and a device type of each of the plurality of user devices.

4. The method of claim 1, further comprising
comparing the identifier of the antivirus software to a list of approved antivirus software applications, and
wherein remotely initiating the antivirus software installed locally on the user device includes remotely initiating the antivirus software installed locally on the user device when the identifier of the antivirus software is included in the list of approved antivirus software applications.

5. The method of claim 1, wherein remotely initiating the antivirus software installed locally on the user device includes generating an application programming interface call based on the identifier of the antivirus software.

6. The method of claim 1, wherein remotely initiating the antivirus software installed locally on the user device includes generating an application programming interface call based on the identifier of the antivirus software and the user device.

7. The method of claim 1, wherein remotely initiating the antivirus software installed locally on the user device includes generating an application programming interface call based on the identifier of the antivirus software and the infected file.

8. The method of claim 1, further comprising receiving status information from the antivirus software installed locally on the user device and presenting at least a portion of the status information within a user interface.

9. The method of claim 8, further comprising, in response to the status information indicating a failure of the antivirus software installed locally on the user device, notifying a user of the user device of the failure and recommending an action for the user to perform to attempt to repair the user device.

10. A system for repairing user devices infected with malicious code, the system comprising:
a memory storing a plurality of files within a remote file storage system accessible by a plurality of user devices; and an electronic processor configured to, in response to detection of an infected file within the plurality of files stored within the memory,
- determine a user device included in the plurality of user devices interacting with the infected file stored within the remote file system, wherein interacting with the infected file includes at least one selected from a group comprising uploading the infected file to the remote file storage system, accessing the infected file included within the remote file storage system, and modifying the infected file included within the remote file storage system,
- determine, using registration information for the user device including a unique identifier of the user device and an identifier of an antivirus software installed locally on the user device, the antivirus software installed locally on the user device,
- prompt a user associated with the user device to approve remote initiation of the antivirus software installed locally on the user device, and
- in response to receiving approval of the remote initiation of the antivirus software, remotely initiate the antivirus software installed locally on the user device using the registration information.

11. The system of claim 10, wherein the electronic processor is further configured to
- compare the antivirus software installed locally on the user device to a list of approved antivirus software applications, and remotely initiate the antivirus software installed locally on the user device when the antivirus software is included in the list of approved antivirus software applications.

12. The system of claim 10, wherein the electronic processor is configured to remotely initiate the antivirus software installed locally on the user device by generating an application programming interface call based on at least one selected from a group consisting of the antivirus software, the user device, and the infected file and transmit the application programming interface call to the user device.

13. The system of claim 10, wherein the electronic processor is further configured to receive status information from the antivirus software installed locally on the user device and presenting at least a portion of the status information within a user interface.

14. A non-transitory computer-readable medium storing instructions that, when executed by an electronic processor, perform a set of functions, the set of functions comprising:
- determining a user device interacting with an infected file detected within a remote file storage system wherein interacting with the infected file includes at least one selected from a group comprising uploading the infected file to the remote file storage system, accessing the infected file included within the remote file storage system, and modifying the infected file included within the remote file storage system;
- determining, using registration information for the user device including a unique identifier of the user device and an identifier of an antivirus software installed locally on the user device, the antivirus software installed locally on the user device;
- prompting a user associated with the user device to approve remote initiation of the antivirus software installed locally on the user device; and
- remotely initiating, using the registration information, the antivirus software installed locally on the user device in response to receiving approval of the remote initiation.

15. The non-transitory computer-readable medium of claim 14, wherein determining antivirus software installed locally on the user device includes receiving information associated with the antivirus software from a synchronization client installed locally on the user device for the remote file storage system.

16. The non-transitory computer-readable medium of claim 14, wherein remotely initiating the antivirus software installed locally on the user device includes generates and transmitting an application programming interface call to the user device.

* * * * *